United States Patent
Hamilton, II et al.

(10) Patent No.: US 7,895,278 B2
(45) Date of Patent: Feb. 22, 2011

(54) METHOD FOR AUTOMATICALLY MODIFYING ELECTRONIC DISTRIBUTION LISTS USING PREDEFINED RULES

(75) Inventors: Rick Allen Hamilton, II, Charlottesville, VA (US); Jenny S. Li, Danbury, CT (US); Brian Marshall O'Connell, Cary, NC (US); Keith Raymond Walker, Austin, TX (US); Susan Marie Williams, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 12/013,525

(22) Filed: Jan. 14, 2008

(65) Prior Publication Data

US 2009/0182820 A1 Jul. 16, 2009

(51) Int. Cl.
*G06F 15/16* (2006.01)
*G06F 15/173* (2006.01)
(52) U.S. Cl. .................................. 709/206; 709/224
(58) Field of Classification Search ................ 709/206, 709/224
See application file for complete search history.

(56) References Cited

U.S. PATENT DOCUMENTS

| | | | |
|---|---|---|---|
| 5,283,856 A | | 2/1994 | Gross et al. |
| 5,377,354 A | * | 12/1994 | Scannell et al. ............. 718/103 |
| 5,664,207 A | | 9/1997 | Crumpler et al. |
| 5,819,274 A | | 10/1998 | Jackson, Jr. |
| 5,828,836 A | | 10/1998 | Westwick et al. |
| 5,864,684 A | | 1/1999 | Nielsen |
| 5,917,489 A | * | 6/1999 | Thurlow et al. ............. 715/809 |
| 6,047,310 A | | 4/2000 | Kamakura |
| 6,057,841 A | * | 5/2000 | Thurlow et al. ............. 715/809 |
| 6,081,707 A | | 6/2000 | Christensen et al. |
| 6,148,064 A | | 11/2000 | Christensen et al. |
| 6,434,601 B1 | * | 8/2002 | Rollins ....................... 709/206 |
| 6,671,718 B1 | * | 12/2003 | Meister et al. .............. 709/206 |
| 6,895,427 B2 | | 5/2005 | Quine et al. |

(Continued)

OTHER PUBLICATIONS

Murray, Katherine; Chapter 2: Microsoft Office Outlook 2003 and Messaging; Published Mar. 26, 2003; [online]. < URL: http://www.microsoft.com/mspress/books/sampchap/6529.aspx#122  >. 11 pages.

(Continued)

*Primary Examiner*—George C Neurauter, Jr.
(74) *Attorney, Agent, or Firm*—Schmeiser, Olsen & Watts; Mark Vallone (57) ABSTRACT

An initial distribution list is dynamically modified using criteria determined from the current entries in the list. After an originator generates a distribution list and prior to submission of the message to entries on the generated list, the method of the present invention examines the entries in the created distribution list. From this list, the invention identifies features of the entries. From these features, the method generates criteria that can be used to generate additional entries that may be included in the list. In one approach, the generated criteria are presented to the user for review and approval. If the originator approves the criteria, the generated list is modified to add additional entries to the distribution based on the generated criteria. If the originator rejects the criteria, the initially generated list is submitted and the message is sent to the entries on the initial list.

20 Claims, 6 Drawing Sheets

U.S. PATENT DOCUMENTS

| | | | |
|---|---|---|---|
| 6,970,908 B1* | 11/2005 | Larky et al. | 709/206 |
| 7,039,639 B2 | 5/2006 | Brezin et al. | |
| 7,042,588 B2 | 5/2006 | Ueda et al. | |
| 7,051,076 B2 | 5/2006 | Tsuchiya | |
| 7,155,419 B2 | 12/2006 | Blackman et al. | |
| 7,181,496 B1* | 2/2007 | Edwards et al. | 709/206 |
| 7,249,160 B2 | 7/2007 | Nozaki et al. | |
| 7,249,175 B1* | 7/2007 | Donaldson | 709/225 |
| 7,269,568 B2 | 9/2007 | Stiles et al. | |
| 7,343,303 B2 | 3/2008 | Meyer et al. | |
| 7,380,126 B2* | 5/2008 | Logan et al. | 713/176 |
| 7,454,195 B2 | 11/2008 | Lewis et al. | |
| 7,467,183 B2* | 12/2008 | Arcuri et al. | 709/203 |
| 7,590,548 B2 | 9/2009 | Meyer et al. | |
| 2002/0078052 A1 | 6/2002 | Cheng | |
| 2002/0087534 A1 | 7/2002 | Blackman et al. | |
| 2002/0103873 A1 | 8/2002 | Ramanathan et al. | |
| 2003/0072488 A1 | 4/2003 | Barsness et al. | |
| 2004/0199587 A1* | 10/2004 | McKnight | 709/206 |
| 2005/0010645 A1 | 1/2005 | Arshi et al. | |
| 2005/0153686 A1* | 7/2005 | Kall et al. | 455/412.1 |
| 2006/0031328 A1* | 2/2006 | Malik | 709/206 |
| 2006/0075036 A1 | 4/2006 | Malik | |
| 2006/0168057 A1* | 7/2006 | Warren et al. | 709/206 |
| 2007/0005708 A1* | 1/2007 | Juliano | 709/206 |
| 2007/0050456 A1 | 3/2007 | Vuong et al. | |
| 2007/0143472 A1 | 6/2007 | Clark et al. | |
| 2007/0261099 A1 | 11/2007 | Broussard et al. | |
| 2008/0162652 A1* | 7/2008 | True et al. | 709/206 |
| 2008/0177994 A1 | 7/2008 | Mayer | |
| 2009/0094240 A1* | 4/2009 | Bordeaux et al. | 707/7 |
| 2010/0049807 A1* | 2/2010 | Thompson | 709/206 |

OTHER PUBLICATIONS

D. L. Manager; Copyright 1998-2009 Geisel Envisioning International Ltd. [online]. Retrieved from the Internet Sep. 29, 2009. < URL: http://www.madsolutions.com/DL/Version5.0/WhatsNew.htm >. 1 page.

Microsoft® Systems Management Server (SMS); Chapter 4: Managing Collections and Queries; 2003; [online]. < URL: http://spa.its.uiowa.edu/ecm/imaging/SMS/Managing%20Collections%20and%20Queries.pdf >. pages 96-124.

Microsoft® TechNet ; Chapter 11—Managing Collections and Queries; 2009; [online]. < URL: https://www.microsoft.com/technet/prodtechnol/sms/sms2/proddocs/smsadm/part3/smsad11.mspx?mfr=true >; 20 pages.

U.S. Appl. No. 11/924,648, filed Oct. 26, 2007; First Named Inventor Rick Allen Hamilton et al.; Confirmation No. 1620.

U.S. Appl. No. 11/867,151, filed Oct. 4, 2007; First Named Inventor Rick Allen Hamilton et al.; Confirmation No. 8507.

Office Communication (Mail Date Mar. 31, 2010) for U.S. Appl. No. 11/867,151, filed Oct. 4, 2007; Confirmation No. 8507.

Notice of Allowance (Mail Date Jul. 13, 2010) for U.S. Appl. No. 11/867,151, filed Oct. 4, 2007; Confirmation No. 8507.

Office Action (Mail Date Sep. 23, 2010) for U.S. Appl. No. 11/924,648, filed Oct. 26, 2007; Confirmation No. 1620.

* cited by examiner

Eagle Project

Phase 1

Group Alpha

Alpha 1 (L)
Alpha 2 (E)
Alpha 3 (E)
Alpha 4 (P)
Alpha 5 (P)
Alpha 6 (P)

Group Beta

Beta 1 (L)
Beta 2 (E)
Beta 3 (E)
Beta 4 (E)
Beta 5 (P)
Beta 6 (P)
Beta 7 (P)
Beta 8 (P)

Phase 2

Group Delta

Delta 1 (L)
Delta 2 (E)
Delta 3 (P)
Delta 4 (P)
Delta 5 (P)

Group Gamma

Gamma 1 (L)
Gamma 2 (L)
Gamma 3 (E)
Gamma 4 (E)
Gamma 5 (E)
Gamma 6 (E)
Gamma 7 (P)
Gamma 8 (P)
Gamma 9 (P)
Gamma 10 (P)
Gamma 11 (P)
Gamma 12 (P)

FIG. 3

Rule 1 All emails sent to a group member related to the Eagle Project are distributed to the group leader.

Rule 2 Any email message sent to an engineer in a phase of the Eagle project is sent to each engineer in that project phase.

Rule 3 Any message received by a programmer in a group is sent to each programmer in the group of the initial message recipient.

Rule 4 Any project related email sent to a group leader is sent to each project group leader.

FIG. 4a

Rule 1 All emails sent to a group member related to the Eagle Project are distributed to the group leader.

| Initial Distribution List | Modified Distribution List |
|---|---|
| Alpha 2 | *Alpha 1* |
| Alpha 3 | Alpha 2 |
|  | Alpha 3 |

Rule 2 Any email message sent to an engineer in a phase of the Eagle project is sent to each engineer in that project phase.

| Initial Distribution List | Modified Distribution List |
|---|---|
| Alpha 2 | Alpha 2 |
| Beta 3 | *Alpha 3* |
| Beta 4 | *Beta 2* |
|  | Beta 3 |
|  | Beta 4 |

Rule 4 Any project related email sent to a group leader is sent to each project group leader.

| Initial Distribution List | Modified Distribution List |
|---|---|
| Alpha 1 | Alpha 1 |
| Beta 1 | Beta 1 |
| Delta 1 | Delta 1 |
|  | *Gamma 1* |

METHOD FOR AUTOMATICALLY MODIFYING ELECTRONIC DISTRIBUTION LISTS USING PREDEFINED RULES

FIELD OF THE INVENTION

The present invention relates to a method for generating and modifying distribution lists for the purpose of electronic distribution of information to entries on the list and in particular, this invention relates to a method for automatically modifying a previously generated distribution list by applying a set of one or more predefined rules.

BACKGROUND OF THE INVENTION

Advancements in technology have made the electronic distribution of information a more convenient task. Satellites, telephone systems and communication networks such as the Internet provide many tools to communicate information. As a result of the ability to conveniently distribute information, organizations have incorporated these technological advancements into their operations. One approach in the mass distribution of information is to have distribution lists. These lists contain several names or entries that simultaneously receive information from a source. A result of the increasing number of potential data recipients is the difficultly in coordinating data delivery to a wide audience, e.g., a large number of recipients. Towards this end, distribution lists, or "mailing lists" in an electronic document context such as E-mail, have been developed to facilitate grouping and tracking recipients.

The creation of these lists can be a tedious and/or complex manual task, since there may be many list members requiring processing for entry on to the list. Some of these lists are manually created and other lists are automatically created based on characteristics of an environment, e.g., a "customers" list may refer to all customers of a computing system. However, regardless of how the list is created, in some instances, persons that need to receive the information are omitted from the distribution list. When omissions occur, the sender may not be aware of the omission or may not know of persons that need to receive the information. Traditional static distribution lists and dynamic distribution lists do not provide the features commonly needed in a multiple of usage scenarios.

There are several usages of distribution lists that are not efficiently addressed using present static or dynamic distribution lists. The present state of distribution lists does not provide the following functionality: (1) Permanent and Semi-permanent modification of static distribution lists from a message destination field; (2) Semi-temporary modification with a temporal component static distribution lists from a message destination field; and (3) Creation of semi-permanent or permanent distribution lists by combining static or dynamic distribution lists using a variety of set operations.

Current technology has addressed some of the problems associated with modifying electronic distribution lists. U.S. patent application, publication number 2005/0010645 provides a method in which additive and subtractive message operations can be performed on a distribution list based at least in part on an intersection of various distribution lists to determine, if only temporarily, a new distribution list for a message. A particular distribution list may respectively be combined or intersected with an additive or a subtractive distribution list. Thus, for example, an e-mail message may be addressed to a distribution list for all employees, but where a subtractive list is applied to remove certain employees from receiving the e-mail message. The distribution list for all employees need not be altered. Although this method does provide a means to modify distribution lists, this method is limited and does not provide any features to semi-permanent distribution lists that last for an extended period of time following the distribution of information to entries on that semi-permanent distribution list. In addition, this method does not provide the means for incorporating dynamic decision-making capabilities for determining whether to save a newly generated distribution list into message transmission instructions.

There remains a need for an advanced method for automatically modifying a previously generated distribution lists based on a set of one more distribution rules. The list modification is done without interaction or input by the user or sender of the message.

SUMMARY OF THE INVENTION

This method of the present invention describes a method to automatically and dynamically modify a currently created distribution list using a predetermined set of rules. After the generation of a distribution by a user and prior to submission of the message to entries on the generated list, the method of the present invention examines the entries in the created distribution list. The method determines if any of a set of predetermined rules applies to the initially generated list. If any of the rules do apply to the list, then the list is modified based on the criteria of the rule. If there is more than one rule that applies to the initially generated list, then in this method there can be determination of whether the applicable rules conflict with each other. When there is a conflict a priority of the rules is made and the rules are applied to the list according to the established priority. In this method, the user or message sender does not approve the list once it has been modified. The information in the message is automatically sent to the entries on the newly generated list. If there are no rules that apply to the initial distribution list, then the information contained in the message is sent to the entries on the initial distribution list.

This invention enhances current art with the ability to add situational business flexibility, nested grouping capabilities and enable dynamic updates to a predefined distribution list. The disclosed methods enable temporary or permanent modification of distribution lists from information derived from the entries in the list. Such modifications are often needed when users do not know all persons that should receive certain information.

The invention includes methods to use mathematical formulas, logical operations, and programmable operators to create an adaptive group list that addresses situational needs of the sender and recipients. Note that such adaptive groups as defined here could be used in conjunction with any kind of electric communication methodologies.

Mathematical Operations Include:
  "+" for addition, i.e., add a user to the group Logical Operations can be:
  UNION—for union of multiple sets The invention is a combination of known techniques in a non-obvious manner, as well as the creation of new techniques. The known elements, which are combined, are collaboration software and dynamic distribution lookups. The new techniques include the application of mathematical symbols to distribution lists and set operations upon distribution lists. The added flexibility of the present invention to existing technology with regard to the modification of distribution groups allows senders to modify existing, defined groups to ensure that all appropriate persons receive transmitted information.

DESCRIPTION OF THE DRAWINGS

FIG. 4b is an illustration of modified distribution lists generated from rules displayed in FIG. 4a.

DETAILED DESCRIPTION OF THE INVENTION

The present invention provides a method for creating and/or modifying distribution lists used for mass distribution of information to entries on the distribution list. This method can apply to any form of distribution for example email messages or telephone messages. Although there can be various applications of the technology described in the present invention, the application used for the purpose of describing the invention will be an electronic mail application.

Figure 1:
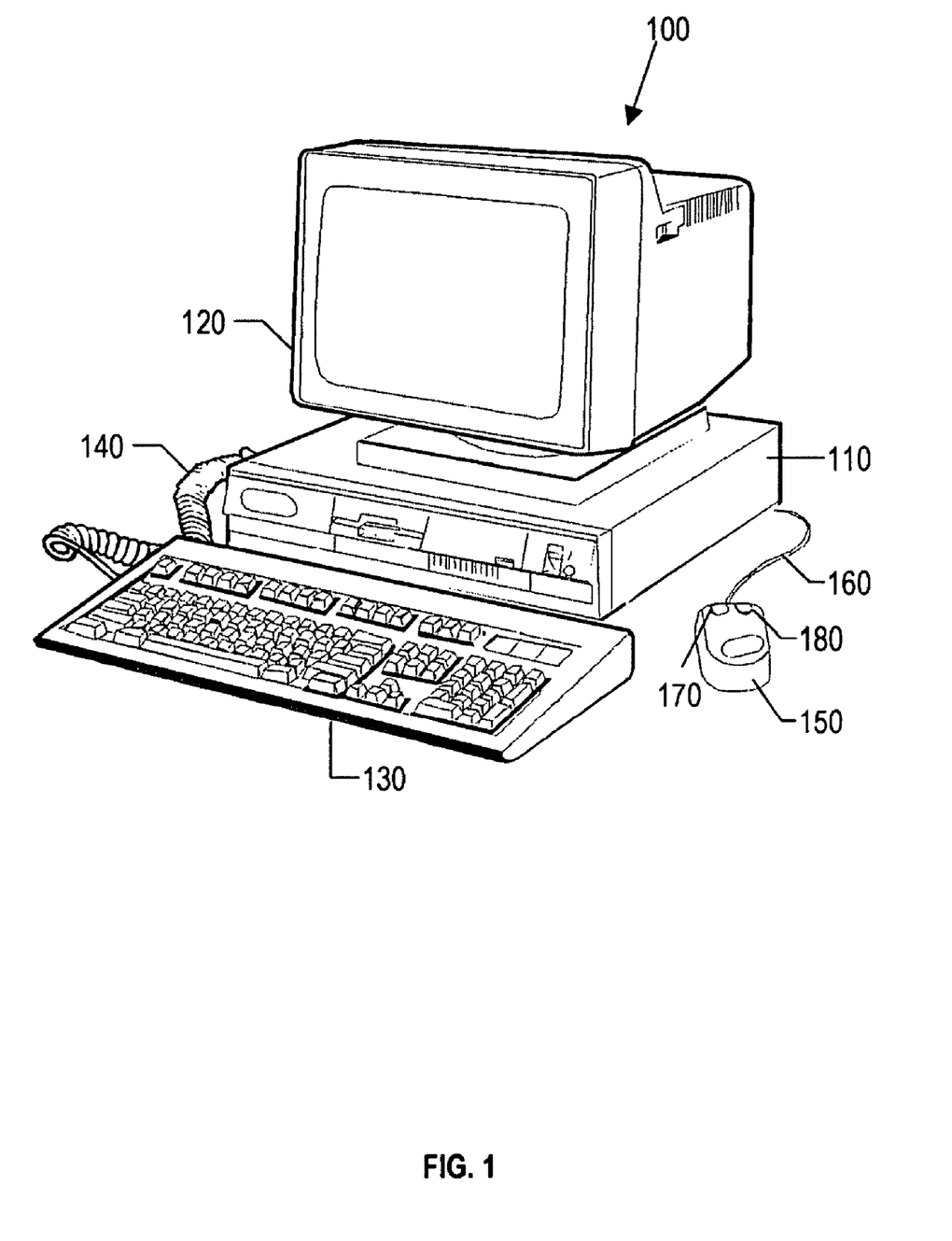
FIG. 1 is a pictorial representation of a personal computing device, which may be used in implementation of the present invention.

With reference now to FIG. 1, there is depicted a pictorial representation of computing device 100 which may be used in implementation of the present invention. Although the invention is described in terms of the device illustrated in FIG. 1, other types of electronic devices capable of transmitting and receiving information can be used in the implementation of the present invention. As seen in FIG. 1, data processing system 100 includes processor 110 that preferably includes a graphics processor, memory device and central processor (not shown). Coupled to processor 110 is video display 120 which may be implemented utilizing either a color or monochromatic monitor, in a manner well known in the art. Also coupled to processor 110 is keyboard 130. Keyboard 130 preferably comprises a standard computer keyboard, which is coupled to the processor by means of cable 140. Also coupled to processor 110 is a graphical pointing device, such as mouse 150. Mouse 150 is coupled to processor 110, in a manner well known in the art, via cable 160. As shown, mouse 150 may include left button 170, and right button 180, each of which may be depressed, or "clicked", to provide command and control signals to data processing system 100. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 100 may be implemented utilizing a personal computer.

Figure 2:
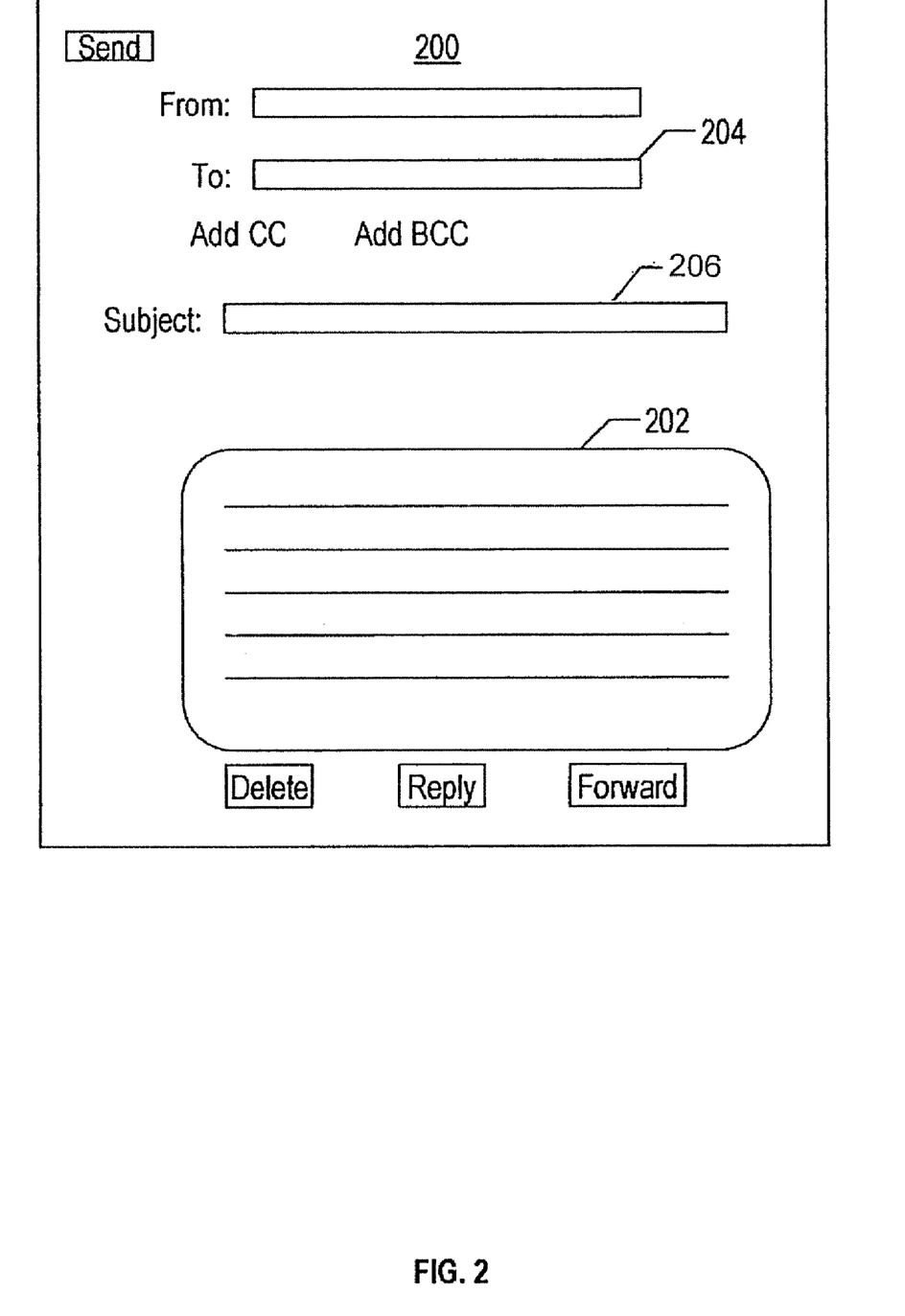
FIG. 2 is a screen of a device (a computer screen) used for transmission of information to entries on a distribution list.

FIG. 2 shows a screen 200 that a sender may use to designate the distribution list and the sending or distribution requirements for the message. As shown, the screen appears to be a typical screen used to compose and send an electric mail message. The message area 202 provides the place for the sender to compose the message. The screen also has many features that are common to electronic mail systems. The "To" field 204 also referred to as the 'destination field' provides a place for the sender to input the destination location information. Below the message area are other message controls available to the user. Also included in the message is a subject field 206. This field can be used to identify a description of the message content. One example is to identify the project name or group name in the project.

Figure 3:
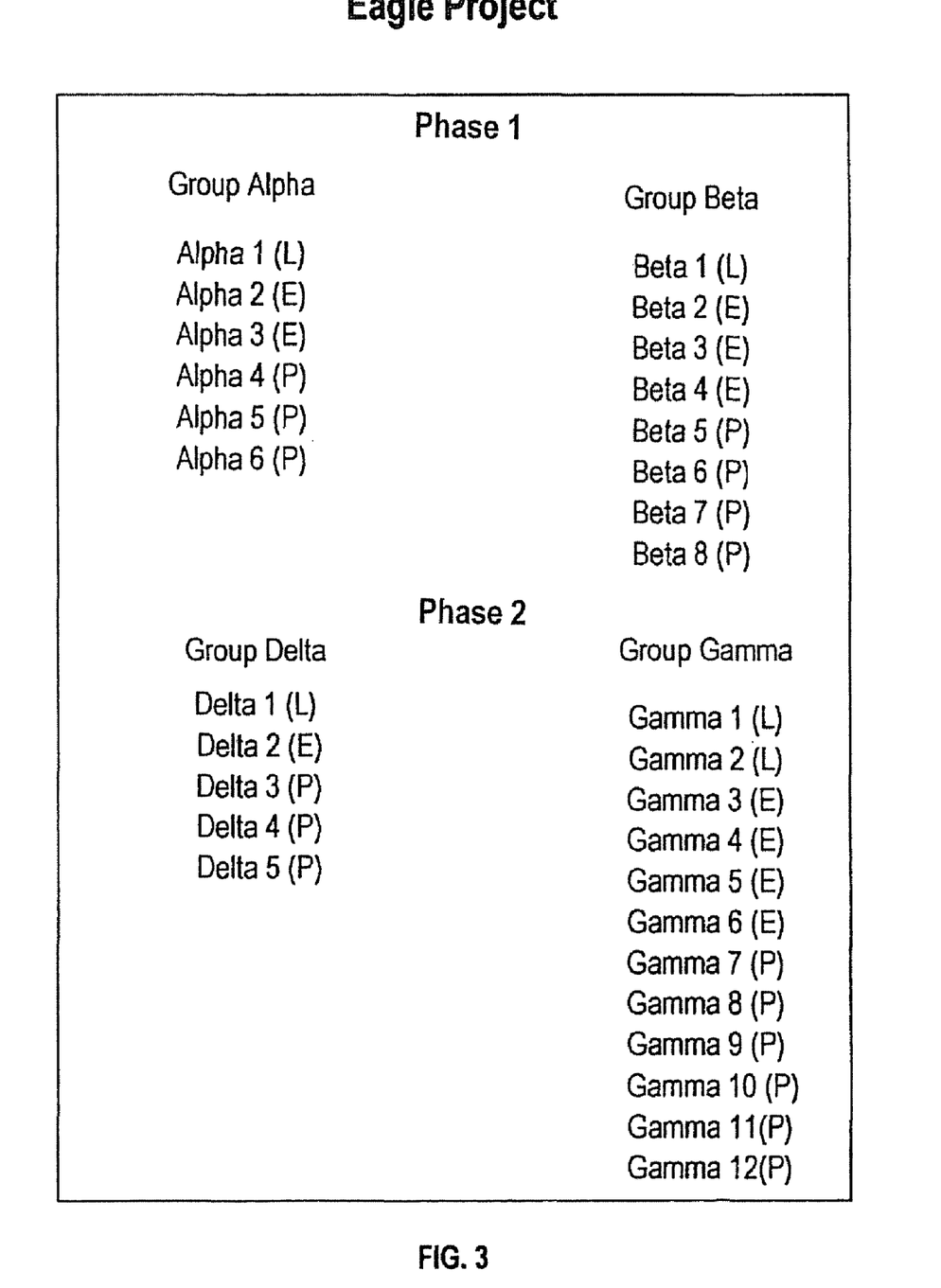
FIG. 3 is a list of entries in multiple groups from which a user may want to send.

FIG. 3 shows potential entries from which one can generate initial and modified distribution lists. These entries represent personnel that are part of a project referred to as the Eagle Project. The personnel includes group leaders (L), engineers (E) and programmers (P). In this project, there are two phases and four separate groups: Alpha, Beta, Delta and Gamma. There can be occasions when a message is sent to some persons in this project, but other persons in the project that should also receive the message are omitted from the distribution list. This list of personnel can be stored in a memory location or directory such that the project, phase, group and each individual are stored in the memory location. The project information can be used to identify different criteria from which the present invention generates alternate distribution lists. The groups in FIG. 3 will be used to illustrate the steps in the present invention.

Figure 4A:
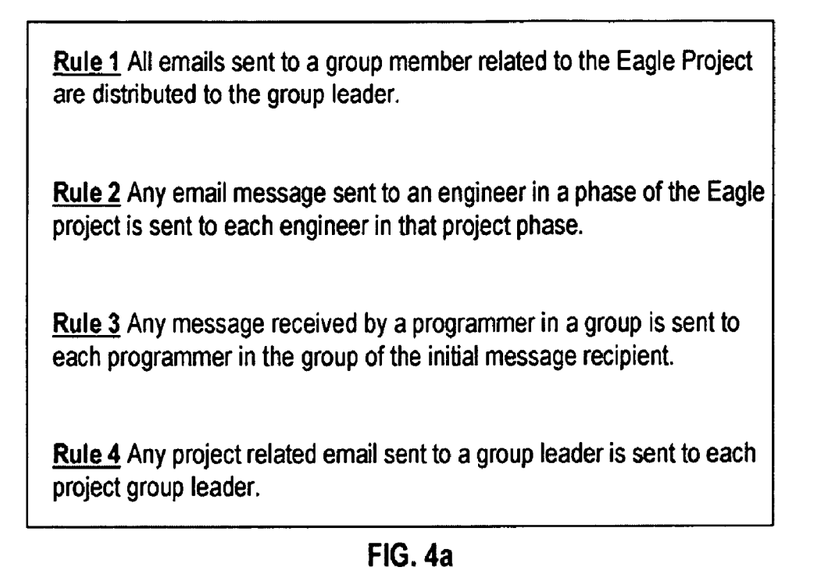
FIG. 4a is a sample list of rules that would apply to message list in order to generate alternate distribution list.

FIG. 4a illustrates a set of rules stored in a rules repository that can be used to modify distribution lists. In Rule 1, all emails sent to a group member related to the Eagle Project are distributed to the group leader. In Rule 2, any email message sent to an engineer in a phase (1 or 2) of the Eagle Project is sent to each engineer in that project phase. When Rule 3 is applied to a distribution list any message received by a programmer in a group is sent to each programmer in the group of the initial message recipient. For Rule 4, any project related email sent to a group leader is sent to each project group leader.

Figure 4B:
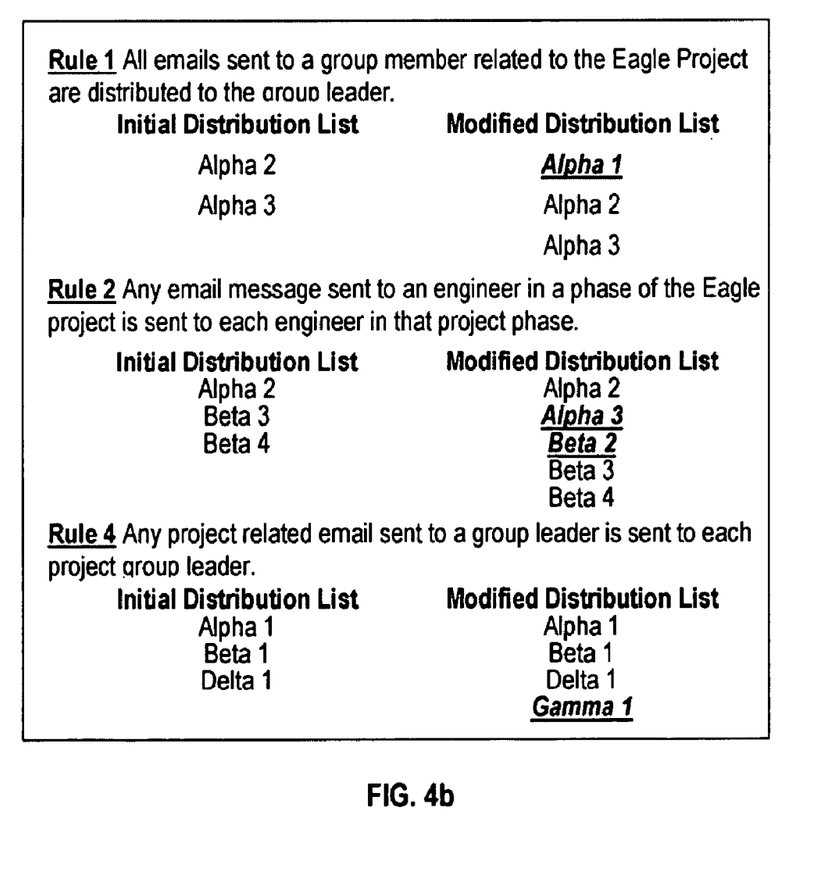

FIG. 4b illustrates the application of rules in this method. In the first example, the initial distribution list contains two entrants from the group alpha list. These two entrants are engineers. Applying Rule 1, all messages sent to a group member related to the Eagle Project are sent to the group leader. As result, the initial list is modified to include the group leader. In the second example, the initial distribution list includes entrants from the alpha and beta groups. The list contains engineers. Rule 2 modifies a distribution list containing entrants that are engineers to include all entrants in a phase of the Eagle Project. The modified list includes all of the entrants from the Alpha and Beta groups that are engineers. In the third example, the initial list contains entrants from Alpha, Beta and Delta groups. Rule 4 takes any Eagle Project related message sent to a group leader and sends it to all group leaders in the project. The modified distribution list adds the Gamma group leader. As mentioned the message is automatically sent to the entrants on the modified distribution list.

Figure 5:
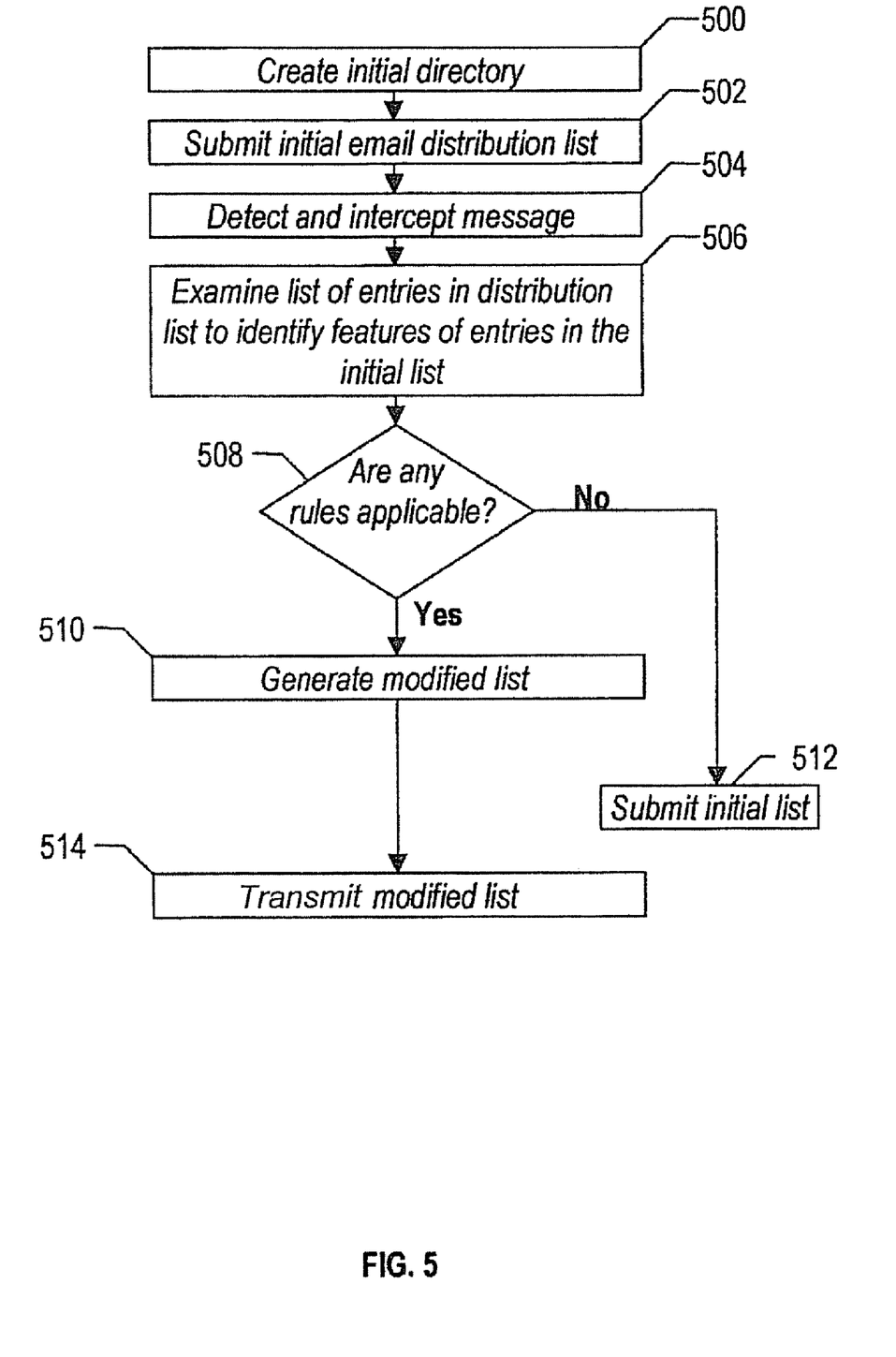
FIG. 5 is a flow diagram of a method in the implementation of an embodiment of the present invention.

FIG. 5 shows a flow diagram of a basic description of the method of the present invention. In this method, the initial step 500 is to establish an initial directory of potential list entries. Referring to FIG. 4, this initial directory could be the people included in the Eagle Project. The initial directory could also be a general company directory, all employees, or all persons in a particular department. This directory can be generated as desired by those implementing the method. The directory and rules that govern changes to initial distribution list entries can be stored in a rules database or repository. Each initial distribution will contain entries. Each entry is designed with a unique identifier in that particular list. In addition, each list is uniquely identified. Referring to FIG. 3, the Alpha group can have an identifier that describes this list as being Group Alpha, Phase I of project Eagle. In addition, each entry can have a one character or string identification along with the information related to the group, phase and project identities.

In step 502, the user submits a message for electronic distribution. This message has an initial distribution of entries that are to receive this message. The method of the present invention detects when the user submits this initial message. Before this message reaches the email server, the present invention in step 504 detects and intercepts the message. At this point, step 506 examines the entries in the message. This examination attempts to identify possible rules that could apply to the list. One approach to implementing this step is to read the subject field 206. If the field has the content description "Eagle Project", then the method could detect it and use that information to identify certain rules that are related to the Eagle Project messages. Another approach could be based on the identity of the sender or a combination of the sender's identity and the content of the subject field. At this point, step 508 determines whether there are any rules that would apply to the current message. If step 508 determines there are no rules that apply to the message, the method moves to step 512 where the message is sent to the entrants on the initially assembled distribution list. If in step 508, rules are found that are applicable to the message and distribution list, then the method moves to step 510 where it applies the rule or rules to the initial distribution list and generates a modified distribution list. At the completion of the generating of the modified distribution list, the message is transmitted to the entrants on the newly generated distribution list in step 514.

Referring back to FIG. 4b, if a message contains the phrase "Eagle Project" and had a distribution list that contains group leaders Alpha 1, Beta 1 and Delta 1. From the method in FIG. 5, step 506 would identify this message as one related to the Eagle Project. At that point, step 508 would examine the list of entrants on the initial distribution list and determine that the list only includes group leaders. There would be a search of the stored rules to determine if any of the rules applied to this list. This search would be based on the name of the project found in the content space and the characterizing of the entrants on the initial distribution list. This step would determine from the characterization of the entrants that the entrants are group leaders. Each entrant could have a code that identifies him or her in some manner. A search of the rules database would produce rule 4. This rule states that any project related message sent to a group leader should be sent to all group leaders on the project. This step 508 would further determine that not all group leaders from the Eagle Project are on the initial distribution list. As a result, rule 4 would be applied to the initial distribution list. This list would be modified in step 510 to generate a new list that includes the group leader for the Gamma group.

Figure 6:
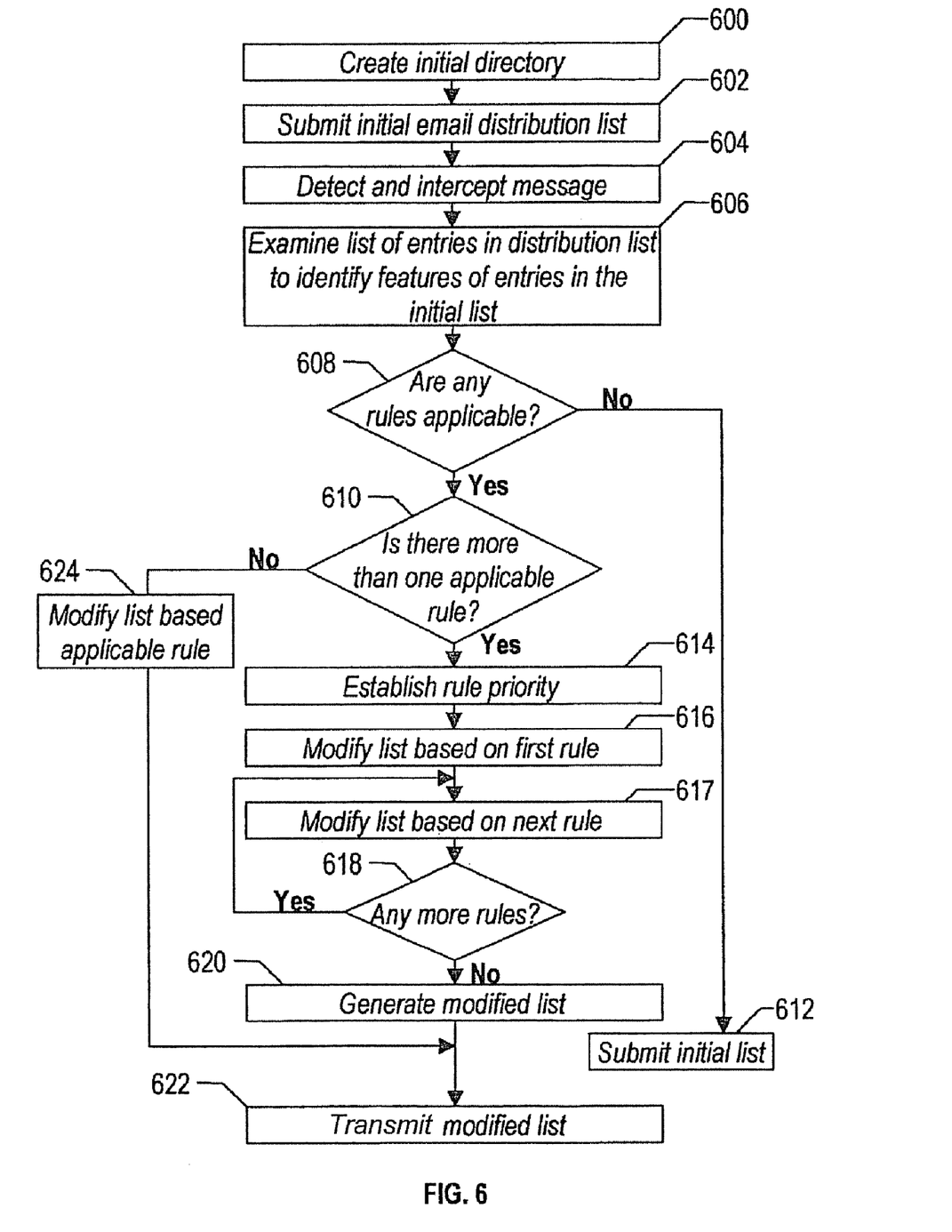
FIG. 6 is a flow diagram of the steps of the method of the present invention in which in which there is a determination of whether multiple rules that apply to an initial distribution list conflict.

FIG. 6 illustrates a method of the present invention when there is a conflict between the applications of rules. In this method, the initial steps 600, 602, 604, 606, 608 and 612 have the same functions as steps 500, 502, 504, 506, 508 and 512 of the FIG. 5 respectively. In step 608, there is a determination of whether there are applicable rules for the distribution list. If step 608, determines that there are no rules that apply to the message, the method moves to step 612 where the message is sent to the entrants on the initially assembled distribution list. If step 608 determines that there are rules applicable to the project, steps 610 determines whether there is more than one applicable rule. If there is only one applicable rule determined in step 610, the method moves to step 624 which generates a most recently modified distribution list based the one applicable rule, after which the method moves to step 622. If there are multiple applicable rules determined in step 610, then the method moves to step 614 where there is a determination of the priority of the application of the rules. When the priority is determined, step 616 will modify the initial list based on the application of the rules with the highest priority. Once the list has been modified based on the highest-ranking rule, the modified list is again modified based on the secondary rule in step 617. After the modification based on the first secondary rule, step 618 determines whether there are any more application rules. When step 618 determines that there are more applicable rules, the method returns to step 617 and applies the next rule. When the determination in step 618 is that there are no more rules, the distribution list that has been modified multiple times becomes, in step 620, the most recently modified list. The message is transmitted to the entrants in the most recently modified list in step 622. When the same address appears in more than one rule, only one instance of that address needs to be added to the distribution list.

Referring to FIG. 6, there is a message with a distribution list that included: Alpha 1, Alpha 2, Beta 3 and Beta 4. Several rules can apply to this message. Rule four includes all group leaders on a message to a group leader. Alpha 1 is a group leader. Rule two includes all engineers in a phase on an email to an engineer in that phase. Alpha 2, Beta 3 and Beta 4 are engineers in the same phase of the project. The priority could be Rule four and then Rule two. One explanation could be organizational and group leaders go before engineers. The initial list would first be modified in step 614 to include Beta 1, Delta 1, and Gamma 1. At this point, the second rule, Rule two would be used in step 616 to modify the modified list. This modified list would include: Alpha 1, Alpha 2, Beta 1, Beta 2, Beta 3, Beta 4, Delta 1 and Gamma 1. Since there are no more rules that are applicable, this second modified list would be the final list. Step 620 would transmit the message to entrants on this final list.

To those skilled in the art, it is observed that this invention may have variations, such as: Different mathematical operators may be chosen to represent either the same or different operations defined in this disclosure; Other algebraic or set theory operations may be applied to distribution groups; Different grouping operations may be used; and other default fields for additions to a distribution list such as the "Cc" or "Bcc" fields.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

We claim:

1. A method for automatically modifying an electronic distribution list using predefined rules, said method comprising:

detecting a submitted electronic message that includes an initial distribution list consisting of at least one entry to which the electronic message is to be transmitted;

intercepting the detected electronic message;

examining the at least one entry in the initial distribution list included in the intercepted electronic message;

responsive to said examining, ascertaining that a rules database comprises at least one rule that is applicable to the at least one entry in the initial distribution list;

responsive to said ascertaining, generating a modified distribution list from the initial distribution list by applying the at least one rule to the at least one entry in the initial distribution list, said modified distribution list resulting from said applying the at least one rule consisting of a plurality of entries, said plurality of entries consisting of at the least one entry and at least one additional entry to which the electronic message is to be transmitted; and after said generating the modified distribution list, transmitting the electronic message to each entry of the plurality of entries in the modified distribution list.

2. The method of claim 1, wherein each entry of the plurality of entries is in the modified distribution list is a member of a plurality of members of a project of a company, wherein each member of the plurality of members of the project is an employee of the company.

3. The method of claim 2, wherein the project comprises a plurality of groups, wherein the plurality of members of the project are distributed into the plurality of groups such that each member of the project is a member of only one group of the plurality of groups, wherein each member of each group is a member of the plurality of members of the project, and wherein at least one member of each group is a group leader of said each group.

4. The method of claim 3, wherein each entry of the at least one entry in the initial distribution list is a member of a first group of the plurality of groups, and wherein each entry of the at least one additional entry is a member of the first group.

5. The method of claim 4, wherein no entry of the at least one entry in the initial distribution list is a group leader of the first group, and wherein said applying the at least one rule results in the at least one additional entry consisting of each group leader of the first group.

6. The method of claim 4, wherein the members of each group consists of at least one group leader, at least one engineer, and at least one programmer, wherein the at least one programmer in the first group consists of at least a first programmer and at least one additional programmer, wherein the at least one entry in the initial distribution list comprises the at least a first programmer and does not comprise the least one additional programmer, and wherein said applying the at least one rule results in the at least one additional entry consisting of the least one additional programmer.

7. The method of claim 3, wherein the plurality of groups consists of at least two groups and at least one additional group, wherein each entry of the at least one entry in the initial distribution list is a group leader of a respective group of the at least two groups, and wherein said applying the at least one rule results in the at least one additional entry consisting of all group leaders of the at least one additional group.

8. A computer program product, comprising a computer readable memory device having a program instructions stored therein, said program instructions configured to be executed by a processor of a computer system to implement a method for automatically modifying an electronic distribution list using predefined rules, said method comprising:

detecting a submitted electronic message that includes an initial distribution list consisting of at least one entry to which the electronic message is to be transmitted;

intercepting the detected electronic message;

examining the at least one entry in the initial distribution list included in the intercepted electronic message;

responsive to said examining, ascertaining that a rules database comprises at least one rule that is applicable to the at least one entry in the initial distribution list;

responsive to said ascertaining, generating a modified distribution list from the initial distribution list by applying the at least one rule to the at least one entry in the initial distribution list, said modified distribution list resulting from said applying the at least one rule consisting of a plurality of entries, said plurality of entries consisting of at the least one entry and at least one additional entry to which the electronic message is to be transmitted; and after said generating the modified distribution list, transmitting the electronic message to each entry of the plurality of entries in the modified distribution list.

9. The computer program product of claim 8, wherein each entry of the plurality of entries is in the modified distribution list is a member of a plurality of members of a project of a company, wherein each member of the plurality of members of the project is an employee of the company.

10. The computer program product of claim 9, wherein the project comprises a plurality of groups, wherein the plurality of members of the project are distributed into the plurality of groups such that each member of the project is a member of only one group of the plurality of groups, wherein each member of each group is a member of the plurality of members of the project, and wherein at least one member of each group is a group leader of said each group.

11. The computer program product of claim 10, wherein each entry of the at least one entry in the initial distribution list is a member of a first group of the plurality of groups, and wherein each entry of the at least one additional entry is a member of the first group.

12. The computer program product of claim 11, wherein no entry of the at least one entry in the initial distribution list is a group leader of the first group, and wherein said applying the at least one rule results in the at least one additional entry consisting of each group leader of the first group.

13. The computer program product of claim 11, wherein the members of each group consists of at least one group leader, at least one engineer, and at least one programmer, wherein the at least one programmer in the first group consists of at least a first programmer and at least one additional programmer, wherein the at least one entry in the initial distribution list comprises the at least a first programmer and does not comprise the least one additional programmer, and wherein said applying the at least one rule results in the at least one additional entry consisting of the least one additional programmer.

14. The computer program product of claim 10, wherein the plurality of groups consists of at least two groups and at least one additional group, wherein each entry of the at least one entry in the initial distribution list is a group leader of a respective group of the at least two groups, and wherein said applying the at least one rule results in the at least one additional entry consisting of all group leaders of the at least one additional group.

15. A computer system, comprising a processor and a computer readable memory device coupled to the processor, said memory device containing program instructions configured to be executed by the processor to implement a method for automatically modifying an electronic distribution list using predefined rules, said method comprising:

detecting a submitted electronic message that includes an initial distribution list consisting of at least one entry to which the electronic message is to be transmitted;

intercepting the detected electronic message;

examining the at least one entry in the initial distribution list included in the intercepted electronic message;

responsive to said examining, ascertaining that a rules database comprises at least one rule that is applicable to the at least one entry in the initial distribution list;

responsive to said ascertaining, generating a modified distribution list from the initial distribution list by applying the at least one rule to the at least one entry in the initial distribution list, said modified distribution list resulting from said applying the at least one rule consisting of a plurality of entries, said plurality of entries consisting of at the least one entry and at least one additional entry to which the electronic message is to be transmitted; and after said generating the modified distribution list, transmitting the electronic message to each entry of the plurality of entries in the modified distribution list.

16. The computer system of claim 15, wherein each entry of the plurality of entries is in the modified distribution list is a member of a plurality of members of a project of a company, wherein each member of the plurality of members of the project is an employee of the company.

17. The computer system of claim 16, wherein the project comprises a plurality of groups, wherein the plurality of members of the project are distributed into the plurality of groups such that each member of the project is a member of only one group of the plurality of groups, wherein each member of each group is a member of the plurality of members of the project, and wherein at least one member of each group is a group leader of said each group.

18. The computer system of claim 17, wherein each entry of the at least one entry in the initial distribution list is a member of a first group of the plurality of groups, and wherein each entry of the at least one additional entry is a member of the first group.

19. The computer system of claim 18, wherein no entry of the at least one entry in the initial distribution list is a group leader of the first group, and wherein said applying the at least one rule results in the at least one additional entry consisting of each group leader of the first group.

20. The computer system of claim 17, wherein the plurality of groups consists of at least two groups and at least one additional group, wherein each entry of the at least one entry in the initial distribution list is a group leader of a respective group of the at least two groups, and wherein said applying the at least one rule results in the at least one additional entry consisting of all group leaders of the at least one additional group.

* * * * *